United States Patent [19]

Miller

[11] 4,205,237

[45] May 27, 1980

[54] LIQUID LEVEL SENSOR, PUMP SYSTEM MEANS AND CIRCUIT MEANS

[75] Inventor: Gerald K. Miller, Hersey, Mich.

[73] Assignee: Nartron Corporation, Reed City, Mich.

[21] Appl. No.: 861,435

[22] Filed: Dec. 16, 1977

[51] Int. Cl.² ............................................. H01H 35/18
[52] U.S. Cl. .................................... 307/118; 340/620; 324/65 P
[58] Field of Search ......... 307/118; 73/304 R, 304 C; 340/620; 137/392, 393, 395; 114/183 R; 116/118 R; 318/482, 484; 324/65 P, 61 P; 361/178

[56] References Cited

U.S. PATENT DOCUMENTS

| | | | |
|---|---|---|---|
| 2,437,134 | 3/1948 | Smith | 324/65 P |
| 3,030,890 | 4/1962 | Galik | 318/484 |
| 3,477,460 | 11/1969 | Dotto | 361/178 X |
| 3,602,251 | 8/1971 | Hill | 137/392 |
| 3,626,400 | 12/1971 | Bates | 340/620 |
| 3,772,531 | 11/1973 | Webb | 307/118 |
| 3,777,177 | 12/1973 | Norkum | 307/118 |
| 4,087,706 | 2/1978 | Koester | 340/620 X |

Primary Examiner—L. T. Hix
Assistant Examiner—James L. Dwyer
Attorney, Agent, or Firm—Lon H. Romanski

[57] ABSTRACT

A plurality of probes are situated as to experience being touched by liquid which is being monitored; when both of such probes are touched by the liquid, related electrical circuit means becomes energized as to cause related pumping means to be activated thereby pumping some of the monitored liquid to, in turn, reduce the level of such monitored liquid; when the level of the monitored liquid decreases to a predetermined level, the pumping means is automatically de-activated; during periods wherein there might occur a momentary splashing or sloshing of the monitored liquid, time delay means serves to delay activation of said pumping means thereby preventing unnecessary activation of the pumping means.

27 Claims, 5 Drawing Figures

LIQUID LEVEL SENSOR, PUMP SYSTEM MEANS AND CIRCUIT MEANS

BACKGROUND OF THE INVENTION

Generally, the invention relates to the monitoring of liquid levels and to the automatic pumping of such liquid as to thereby, generally, be capable of maintaining the level of such monitored liquid below a preselected maximum level, or when considered from yet another point of view, maintaining the level of such monitored liquid within a preselected range of levels. As will become apparent, even though the invention was first conceived in the course of desiring to solve the prior art problems as relate to boat and/or ship bilge pumping systems, the invention, as conceived, and as hereinafter more fully disclosed has applications to fields other than such bilge pumping systems. However, to better appreciate the significance of the invention, the background of the invention will be set forth as it applies to the heretofore prior art proposed bilge pumping systems.

As is well known and recognized, almost without exception, water craft and/or vehicles, for varying reasons, accummulate liquids in the bilge area. In some cases such liquid may be water while in other cases the bilge liquid may even be comprised of oil, gasoline or other substances, singly or in any combination, which may also be mixed with water. Often, such bilges also contain various bits of debris which may or may not float in the liquid but which is, nevertheless, movable therewithin.

Further, since the bilge is generally at the lower part of the hull (or body) of the water craft and since hulls are somewhat streamlined or otherwise non-uniform longitudinally along the keel, it is apparent that, for example, the same level of liquid along the length of the hull does not denote the same unit of volume of such liquid if measured at regular intervals longitudinally along the hull. In other words, the hull may be considered as a vessel of irregular configuration containing therein the bilge liquid. Consequently, if the hull is at rest and not moving with respect to the water, the level of the bilge liquid may be at a first elevation and span the entire distance from the stem to the stern; however, if the hull is then somewhat tilted as to have, for example, the stem or prow become relatively elevated, the level and relative attitude of that same quantity of bilge liquid will change and, quite possibly, will no longer span the entire distance from stem to stern.

Further, during operation of the water craft, the bilge liquid often undergoes sloshing due to, for example, the water craft executing turns or experiencing waves. This, in turn, causes the upper surface of the bilge liquid to rapidly and randomly change in configuration and relative location.

Heretofore, the prior art bilge pumping systems, which were considered to be automatic, employed such devices to float members to sense, by bouyant displacement, the presence of bilge liquid. Such float members, in turn, were employed to open and close related electrical switch means in order to thereby deenergize and energize electrical motor means for driving related pump means. However, as should be apparent, the prior art float members were totally responsive to level of the bilge liquid even if that level was momentary or a false indication of the actual quantity of bilge liquid carried by the water craft. That is, if the relative level and attitude of the bilge liquid was changed for a short period of time, as during turns, etc., the prior art float would respond to the resulting presence or absence of the bilge liquid and accordingly activate or de-activate the pumping means. The same situation would occur when the bilge liquid experienced sloshing.

Also, as the water craft experienced water or wave pounding and reacted as by rolling or pitching, the prior art float members would also become unstable, due to inherent inertia, again resulting in undesired activation and de-activation of related pumping means.

The prior art floats were often associated with related moving linkage means in order that relative motion of the float could be sensed as to thereby activate and de-activate associated pumping means. This raised other problems associated with dirt and corrosion which often prevented such linkage means from having the freedom of relative motion necessary to permit the float to move in response to changes in level of the bilge liquid.

Accordingly, the invention as herein disclosed is primarily directed to the solution of the foregoing as well as other related and attendant problems whether in the art of bilge pumping systems or in other applications of pumping and/or liquid level sensing systems.

SUMMARY OF THE INVENTION

According to the invention, a liquid pumping system comprises two electrical probe means, electrical circuit means associated with said probe means, and liquid pumping means, said probe means being effective when in contact with said liquid to generate related electrical signal means, said electrical circuit means being effective to in turn create an electrical output in response to said electrical signal means, and said liquid pumping means being activated in response to said electrical output in order to thereby pump said liquid from a first area to a second discharge area.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain elements and/or details are omitted from one or more views.

DETAILED DESCRIPTION OF THE PREFERRED EMBODIMENT

Figure 1:
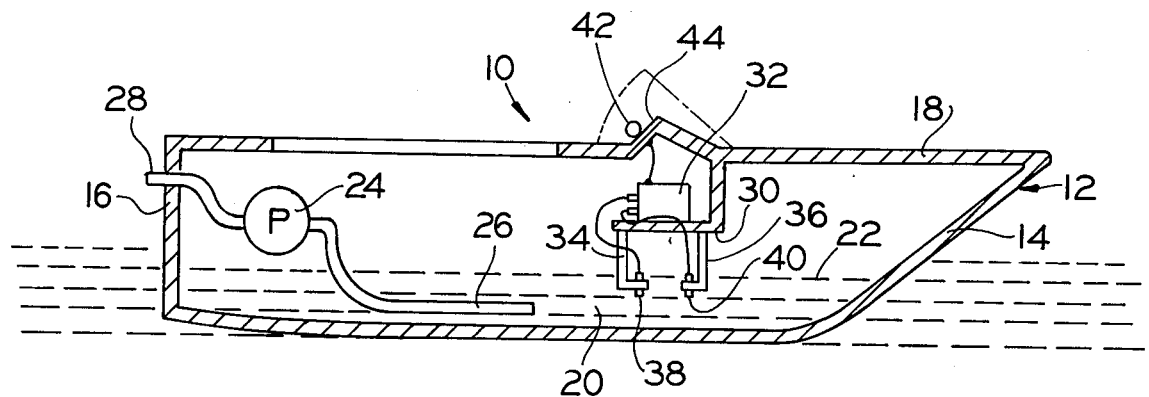
FIG. 1 is a simplified diagrammatic illustration, in longitudinal cross-section, of a water craft provided with apparatus employing teachings of the invention.

Referring now in greater detail to the drawings, FIG. 1, in simplified form, illustrates, in generally longitudinal cross-section, a boat or water craft 10 having a hull 12 with a prow or stem 14 and stern 16 along with related decking 18. The bilge area 20 is shown as containing bilge liquid 22. Suitable liquid pumping means 24, carried as within the hull 12, has an intake or inlet conduit means 26 and an outlet or discharge conduit means 28. Intake conduit 26 may extend, as generally depicted, to any desired area within the bilge and be situated as to be quickly submerged as by the accumulation of even a relatively slight amount of bilge liquid. Further, if desired, the intake end of inlet conduit means 26 may be provided with suitable screen or filter means as to thereby guard against foreign matter becoming lodged therewithin.

Suitable support or platform means 30 serves to support electrical control means 32 while support member 34 and 36 respectively hold probes 38 and 40 at preselected elevations. Related sensory signal or warning means 42, carried as on instrument panel means 44, serves to provide desired sensory signals to the water craft operator.

Figure 2:
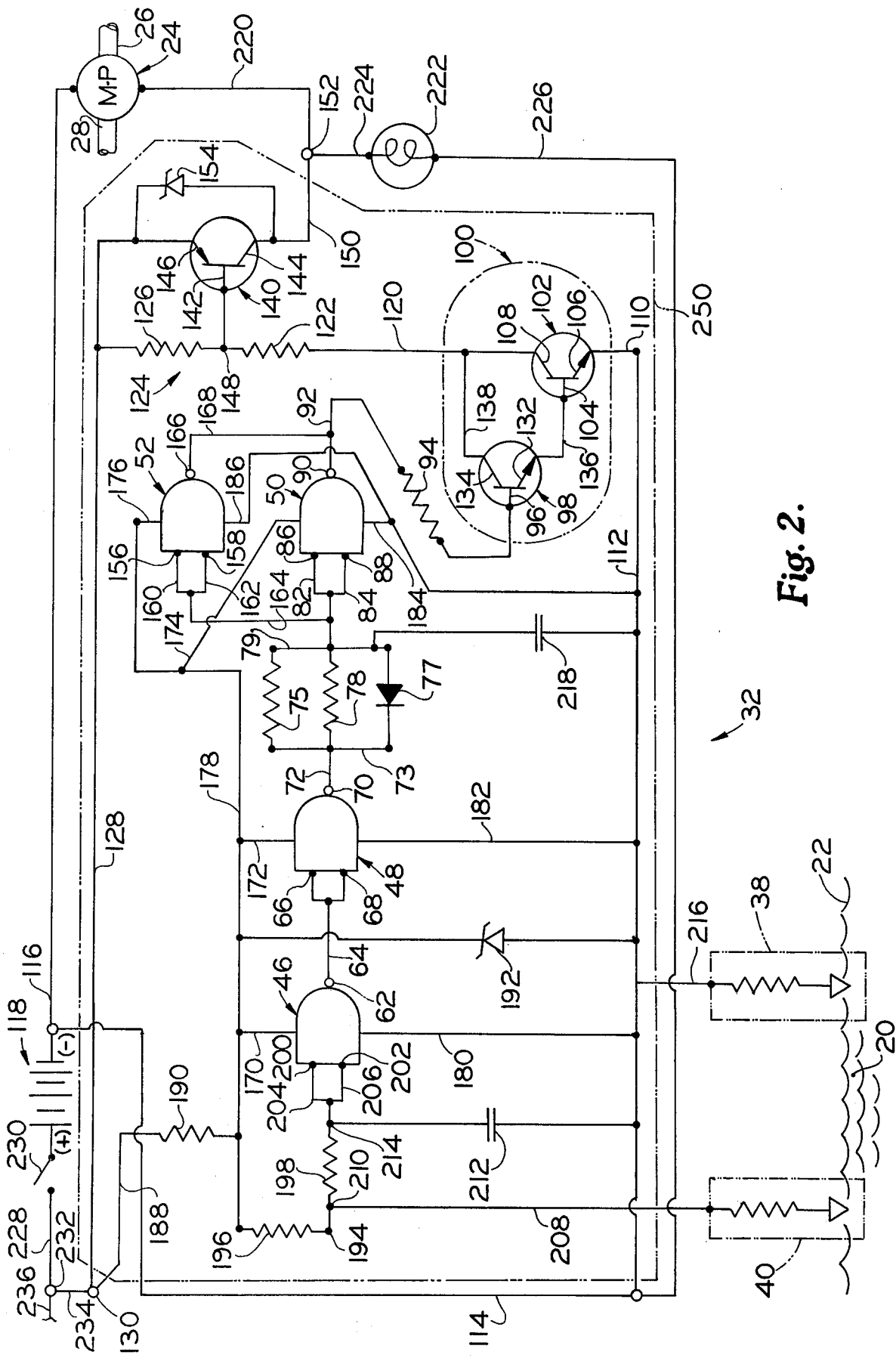
FIG. 2 is a schematic wiring diagram of circuitry embodying teachings of the invention.

Referring to FIG. 2, the electrical circuitry 32 is illustrated as comprising a plurality of C-MOS type integrated circuit NAND gates 46, 48, 50 and 52. The output terminal 62 of gate 46 is electrically connected via conductor means 64 to both input terminals 66 and 68 of gate 48 while the output terminal 70 of gate 48 is connected via conductor means 72, resistor means 78 and branch conductors 82 and 84 to both input terminals 86 and 88 of gate 50. Further, a conductor means 73 serves to electrically connect one end of a resistor 75 and a diode 77 to conductor 72 at a point generally between output terminal 70 and resistor 78, while another conductor means 79 serves to electrically connect the other end of resistor 75 and the other end of diode 77 to conductor means 72 at a point generally between resistor 78 and gate 50.

An output terminal 90 of gate 50 is electrically connected via conductor means 92 and resistor means 94 to the base terminal 96 of an NPN transistor 98 of a Darlington circuit 100 which also comprises a second NPN transistor 102. As depicted, transistor 102 comprises a base terminal 104, emitter electrode 106 and collector electrode 108 with the emitter 106 being electrically connected via conductor 110 to ground conductor means 112 leading to the negative side of the related source of electrical potential 118 as by conductor portions 114 and 116. The collector 108 is connected as by conductor means 120 to one electrical end of resistance means 122 of a voltage divider 124 which also comprises resistance means 126 which has its other electrical end electrically connected to conductor means 128 depicted as having its one end terminating as at a terminal 130. Transistor 98 also comprises an emitter 132 and collector 134 with emitter 132 being connected as by conductor means 136 to base terminal 104 of transistor 102 while collector 134 is electrically connected as via conductor means 138 to collector 108 as through an electrical connection with conductor means 120.

A power or load transistor 140, comprising a base terminal 142, collector 144 and emitter 146, has its base 142 electrically connected as to a point 148 generally between resistors 126 and 122 while its collector 144 is connected to related output branch circuit means 150 which may also comprise suitable terminal means 152. The emitter 146 is electrically connected to conductor means 128 as to thereby result in the emitter collector circuit of transistor 140 comprising a portion of the overall output or load circuit means. A zener diode 154 is preferably provided in parallel across the emitter-collector circuit of transistor 140 as transient voltage protection.

A gate 52 is shown as being in parallel with gate 50. That is, input terminals 156, 158 are placed electrically in parallel with terminals 86 and 88 as by branch circuit portions 160 and 162 and conductor means 164 electrically connected as to conductor means 72 and the gate 50 side of resistors 75 and 78 and diode 77. The output terminal 166 of gate 52 is electrically connected to output terminal 90 as by conductor means 168 and 92. The power input terminals of the gates 46, 48, 50 and 52 may be connected as by respective conductor means 170, 172, 174 and 176 to power supply conductor means 178 while the ground terminals of such gates may be connected as by respective conductor means 180, 182, 184 and 186 to the ground conductor means 112.

A conductor means 188, connected as to terminal means 130, is in series with a current limiting resistor means 190 which, in turn, is electrically connected to conductor means 178. A zener diode 192, electrically across conductor means 178 and 112 serves as a voltage regulator or limiter thereacross.

Conductor means 194 comprising series resistor means 196 and 198 serves to electrically interconnect conductor means 178 with input terminals 200 and 202 of gate 46 as by branch conductor portions 204 and 206, respectively. A first probe assembly 40 is electrically connected as by conductor means 208 to conductor means 194 as at a point 210 generally between resistance means 196 and 198 while capacitor means 212 has its first electrical side connected to ground conductor means 112 and its other electrical side connected as at a point 214 to conductor means 194. The second probe 38 is electrically connected as by conductor means 216 to ground conductor means 112. Additional capacitor means 218 is shown as having its one electrical side electrically connected to conductor means 79 while its other electrical side is electrically connected to ground conductor means 112.

The related motor pump means 24 is shown as having one of its terminals electrically connected as to terminal means 152 as by conductor means 220 while its other electrical terminal is electrically connected to conductor means 116 leading to the negative side of source 118.

Suitable warning or indicating means may be employed; that is, in at least one preferred embodiment of the invention sensory warning or indicating means are employed to convey information to the craft operator that the motor-pump means 24 is energized. By way of example, and not of limitation, FIG. 2 depicts one form of such sensory means as being suitable lamp or bulb means 222 which has its one electrical side connected as to terminal means 152 as by conductor means 224 while its other electrical side is electrically connected to ground potential as by conductor means 226.

Conductor means 228, shown as being connected at one end to source 118, may comprise related switch means 230. Such switch means may be dispensed with; however, if desired it may be employed. In the preferred use of the invention, such switch means 230, if provided, would normally remain closed. Terminal means as at 232 may be provided to which conductor means 228 is connected and from which conductor means 234 conveys power to terminal 130 and conductors 128 188 and, further, from which conductor means 236 may convey power to related engine and/or craft accessories.

GENERAL OPERATION OF INVENTION

As should be apparent, and as previously indicated, resistance 190 and zener diode 192 comprise a regulated power supply means to the gates 46, 48, 50 and 52 and associated circuitry.

Gates 46, 48, 50 and 52 both amplify and invert. Further, probe 40, generally, acts as a voltage divider in conjunction with resistance 196. When probe 40 is out of the bilge liquid, it creates, effectively, what may be thought of as a relatively high resistance providing an "on" signal resulting in input terminals 200 and 202 of gate 46 having applied thereto a "high" signal. Whenever the input signals on both inputs 200 and 202 are "high", the signal at the output 62 of gate 46 is "low"; the "low" signal from output 62 is transmitted via conductor means 64 to both inputs 66 and 68 of gate 48 and, consequently, the signal at output 70 of gate 48 is "high". This "high" signal at output 70 is transmitted via conductor means 72 and applied to both terminals 86 and 88 of gate 50 as well as to both terminals 156 and 158 of gate 52 with the result that the signal at outputs 166 and 90 of gates 52 and 50, respectively, is "low". Since the Darlington circuitry transistor 98 is an NPN, the "low" signal applied to the base 96, via conductor means 92, does not place transistor 98 into conduction which, in turn, results in transistor 102 remaining non-conductive with the circuit described by voltage divider 124, conductor 120 and collector 108 emitter 106 being effectively open. This, in turn, causes transistor 140 to remain non-conductive and motor pump means 24 de-energized.

When probes 38 and 40 are in contact with or immersed in the bilge liquid, the value as at point 210 is brought effectively to a value approaching or equal to ground potential as through a path generally defined by probe 40, bilge liquid 20, probe 38, conductor 216 and conductor 112. Consequently, the signal on both input terminals 200 and 202 of gate 46 go "low" and the signal at the output 62 thereof goes "high" with such being applied to both inputs 66 and 68 of gate 48 which, in turn, has its output signal at 70 become "low".

The "low" output signal at 70 applied via conductor means 72 to each of inputs 156, 158, 86 and 88 cause the signals at respective outputs 166 and 90 to become "high" which, in turn, is applied via conductor means 92 and resistor 94 to base 96 of transistor 98 thereby causing transistor 98 to turn on and become conductive through its collector 134 emitter 132 circuit. As transistor 98 is thusly turned on, transistor 102 is thereby made conductive causing point 148 of voltage divider 124 to become more negative and consequently cause load or power transistor 140 to turn on and become conductive through its emitter 146 collector 144 circuit.

When load transistor 140 is thusly made conductive, the circuit through motor means 24 is completed thereby energizing the motor pump means 24 as to pump fluid through intake 26 and out of outlet 28.

As previously indicated, upon such energization of motor pump means 24, related circuitry becomes effective to energize condition indicating means which, in the embodiment illustrated, comprises lamp or bulb means 222.

When sufficient bilge liquid has been thusly pumped out of the bilge, the level of the bilge liquid drops below the probe 40 resulting in the value of point 210 again being increased and the magnitude of the signal applied to both inputs 200 and 202 again becoming "high" with the ultimate result, as previously described, being that load transistor 140 becomes turned off and non-conductive, through its emitter collector circuit, and motor pump means 24 being de-energized.

With greater detail to certain actions within the circuitry, it should be explained that at the instant that the signal at output 70 of gate goes "low" (as previously described) the previously charged capacitor means 218 discharges through diode 77, terminal 70, gate 48 and conductor means 182 thereby resulting in inputs 156, 158, 86 and 88 experiencing a "low" signal being applied thereto. Further, when sufficient liquid has been pumped and the signal at output 70 of gate becomes "high" (as previously described) capacitor 218 starts to undergo charging through resistors 75 and 78 until the charge thereon reaches the threshold level of input terminals 156, 158, 86 and 88. (By threshold it is meant that value or magnitude at which the signal at such points is deemed to change from a negative to a positive value or from a "low" to a "high" value.) In one successful embodiment of the invention such charging time was in the order of 60 seconds. Nevertheless, when the capacitor 218 becomes sufficiently charged to reach the threshold level, then the signals on input terminals 156, 158, 86 and 88 become "high" and the signals on output terminals 166 and 90 become "low" with the result, as previously explained, that load transistor 140 becomes non-conductive and motor pump means 24 becomes de-energized. Accordingly, remembering that the signal at output 70 changes from "low" to "high" when one of the probe means, such as probe means 40, is out of engagement with the bilge liquid (as, for example, would occur when the pump means 24 pumped out a sufficient quantity of bilge liquid), it can be seen that resistor means 75, 78 and capacitor 218 serve as a time delay means whereby the resulting "high" signal is not applied to gates 52 and 50 for a preselected span of time thereby maintaining load transistor 140 conductive and motor pump means 24 energized to continue, for such preselected span of time, the further pumping of the bilge liquid and thereby reduce or lower the level of such bilge liquid some distance below at least the higher of the two probe means if, in fact, the two probe means are at differing elevations. Aside from assuring that the level of the bilge liquid is thusly somewhat below at least one of the probe means, the time delay means of capacitor 218 and resistance means 75, 78 effectively prevents the premature de-energization of the pumping means 24 as may otherwise occur due to sloshing or the like of the liquid causing a very brief interruption of contact as between the probe means and the sloshing liquid.

Similarly, considering resistor 198 and capacitor 212, when the level of the bilge liquid rises sufficiently to contact both probe means 38 and 40, the previously charged capacitor 212 discharges through resistor 198 and probe means 40 thereby, while thusly discharging, maintaining the signals on input terminals 200 and 202 "high" with the ultimate result being, as previously described, that load transistor 140 is maintained non-conductive and pump means 24 de-energized. When the charge on the discharging capacitor drops below the threshold voltage of inputs 200 and 202 the signal on such inputs becomes "low" and the pump means 24 becomes energized. Therefore, it can be seen that the R-C circuit comprised of resistance 198 and capacitor 212 is effective for causing a time delay between the time that the liquid first contacts both probe means and the time that input terminals 200 and 202 experience a "low" input signal to ultimately energize pumping means 24. Consequently, such a "turn-on" time delay serves to prevent premature energization of the pumping means 24 due to, for example, sloshing or the like of the liquid causing a very brief contact as between the liquid and the probe means. In one successful tested embodiment of the invention, the time delay provided by R-C network 198, 212 was in the order of 6.0 seconds. However, as should be apparent, if time delay means are employed for delaying the turning on and/or turning off of pumping means 24, the magnitude of such time delay may be selected to be any desired value. Further, it is also contemplated that resistance means 198 and/or resistance means 75 and/or resistance means 78 may be variably adjustable resistance means as to enable, if desired, selective adjustment thereof when installed within, for example, a water craft as to accommodate for possibly unique conditions of that water craft and/or surface conditions of the water in which that water craft is situated.

In the embodiment disclosed, it should be noted that energization of the motor pump means 24 will not take place until both probe means 38 and 40 are in contact with or immersed in the bilge liquid. Accordingly, probe means 38 and 40 may be situated at any desired elevation relative to each other and may, in fact, be at the same elevation; however, if one of the probes is at a relatively higher elevation, that relatively higher elevation will determine the level which the bilge liquid must attain before motor pump means 24 will become energized.

Figure 3:
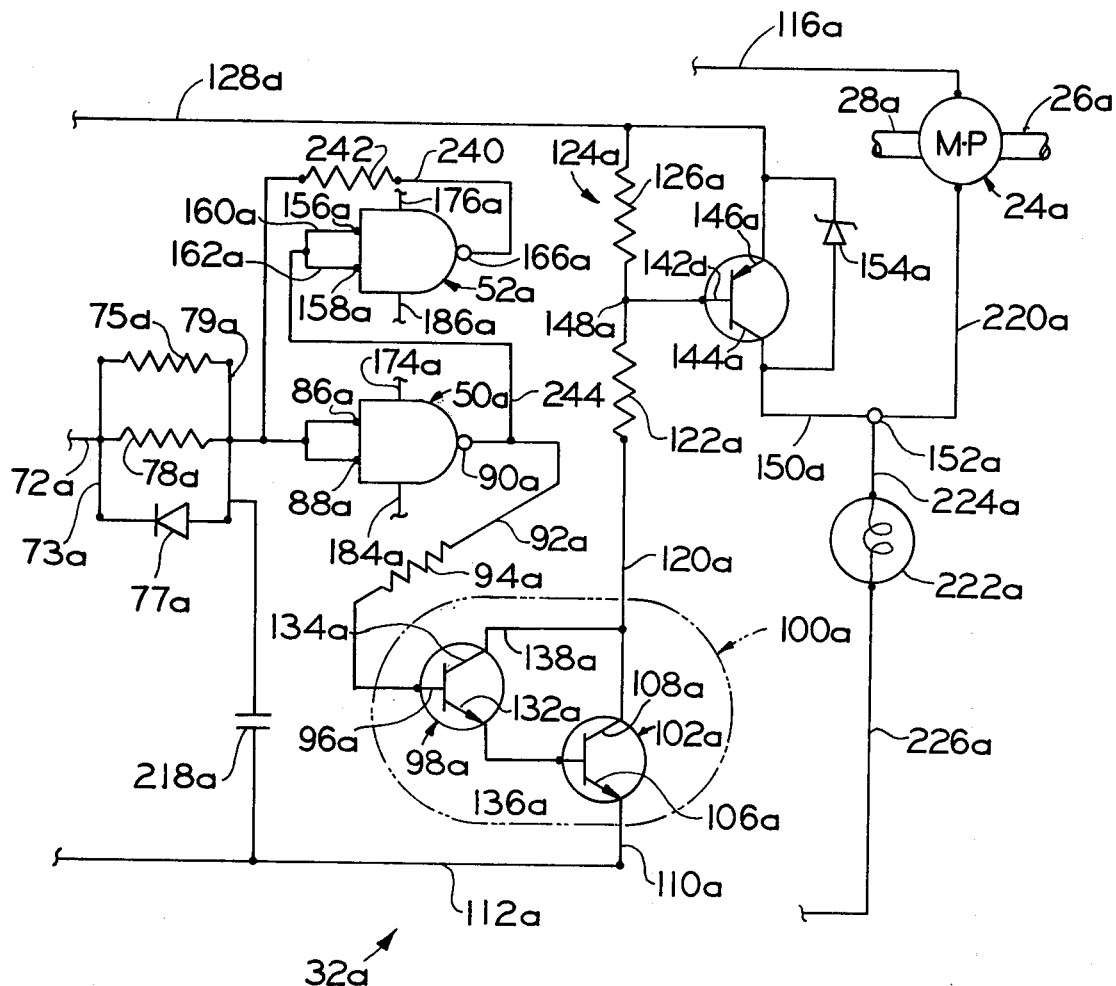
FIG. 3 is a fragmentary schematic wiring diagram illustrating another form of the invention as basically disclosed in FIG. 2.

FIG. 3 illustrates another form of the invention. Only those elements believed necessary to illustrate the other form of the invention are illustrated and, further, such, if similar to those of the preceding Figures are identified with like reference numerals provided with a suffix "a". Otherwise, for purposes of discussion, the remainder of the embodiment of FIG. 3 may be considered as identical to the related remaining portion as shown in FIG. 2.

In viewing FIG. 3, it can be seen that output terminal 166a of gate 52a is connected via conductor means 240 and series resistor means 242 to conductor means 72a (on the gate 50a side of resistors 75a, 78a) while input terminals 156a and 158a are electrically connected via conductor means 244 to output terminal 90a as by conductor means 92a.

The overall operation of the form of the invention shown in FIG. 3 is as that described with reference to the invention shown in FIG. 2. However, in the embodiment of FIG. 3, gate 52a serves as a positive feedback resulting in input terminals 86a and 88a as well as output terminal 90a experience a very rapid or snap-action type change in the quality or magnitude of the signals appearing thereon. For example, when output terminal 90a starts to go "low" (when capacitor 218a is charged to the point that it reaches the threshold voltage of input terminals 86a and 88a), its rate of change, initially is relatively slow and somewhat characteristically exponential. However, as terminal 90a thusly starts to go "low" input terminals 156a and 158a are "low" which, in turn, causes the output at 166a of gate 52a to go "high" resulting in capacitor 218a being charged also through resistance means 242 thereby vastly increasing the charging rate of capacitor 218a and making gate 50a shut off very quickly.

In comparison, the circuitry of FIG. 2 results in a slower charging rate of capacitor 218; however, the parallel arrangement of gates 50 and 52 provide for greater current carrying capacity.

The various gates such as 46, 48, 50 and 52 have been illustrated as separate from each other whereas they may actually comprise, for example, what is often referred to as a quad-chip wherein all of the circuitry is integrated into a physically single component.

As generally indicated by the phantom line 250 of FIG. 2, the elements generally contained therein may be packaged and situated anywhere within the water craft. Since the circuitry is internally grounded and connectable to the source 118 there is no need to rely on any electrically conductive material comprising the water craft hull or structure in order to complete a ground circuit.

Figure 5:
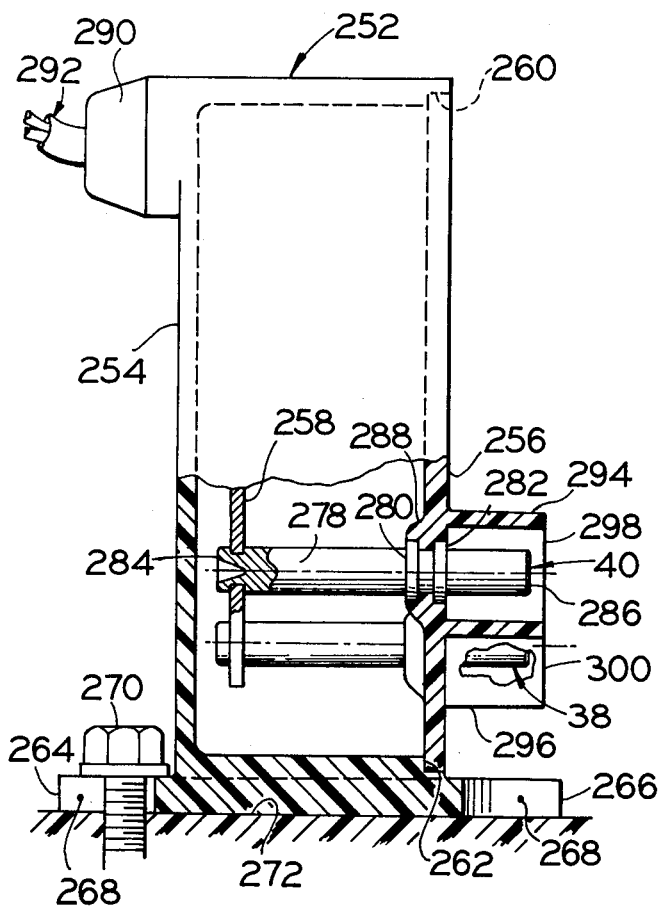
FIG. 5 is a view taken generally on the plane of line 5—5 of FIG. 4 and looking in the direction of the arrows.
Figure 4:
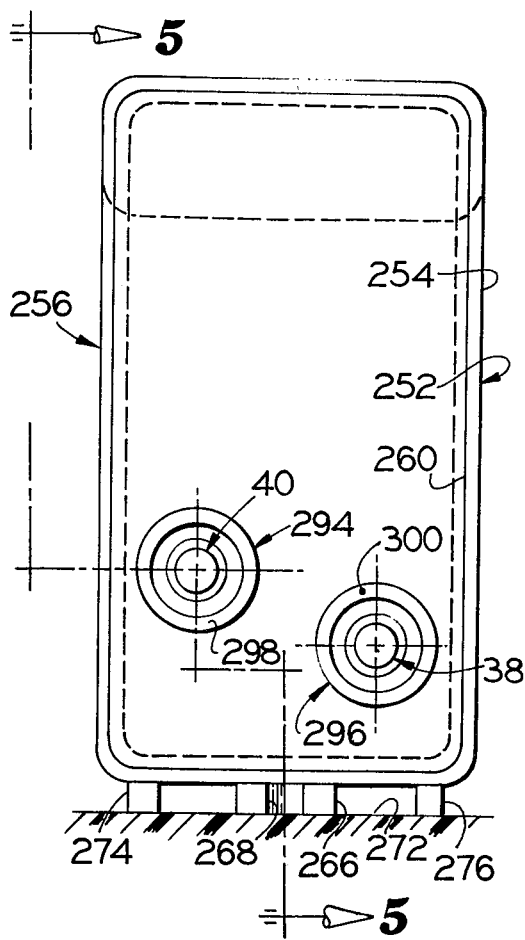
FIG. 4 is a generally side elevational view of one specific embodiment of a sensing device embodying teachings of the invention.

Further, the invention as disclosed in either of FIGS. 2 and 3 may be packaged as on a printed circuit board, as is generally well known in the art, and contained within an outer housing assembly sealed against liquid leakage therein. Referring to FIGS. 4 and 5, such a suitable housing assembly 252 which comprises a housing 254 and a cover 256 with a printed circuit board assembly 258 situated generally within the housing, carrying the circuitry of the invention, and operatively connected to the cover 256 as through probes 40 and 38. As can be seen, the cover 256 is received within a complementary opening 260 and abuts against a peripheral-like flange or shoulder 262 of the housing 254 and preferably sealed thereagainst as by sonic welding or the like.

The lower end wall of housing 254 is provided with laterally extending flange-like portions 264 and 266 each provided with a slot 268 as to accomodate related fastening means 270 in order to secure the assembly 252 as to a lower disposed mounting surface 272 of the related water craft. Further, additional laterally displaced stabilizing abutment means 274 and 276 are preferably integrally formed with housing 254 as to abut against the coacting mounting surface 272. Preferably the material comprising housing 254 and cover 256 is of plastic and electrically non-conductive.

The probe means may be substantially identical and, as shown typically by probe 40, may be comprised of stainless steel having a major cylindrical body 278 with integrally formed annular flanges 280 and 282 with an inner end 284 mechanically deformable as to lock such end onto the printed circuit board in conductive relationship thereto. The other end 286 extends beyond cover 256 as to be exposed to the bilge liquid. Preferably, a boss-like portion 288, provided by cover 256, serves to coact with flanges 280 and 282, as by molding thereagainst or therebetween, to rigidly secure the cover 256 to the related probe. In the embodiment shown in FIGS. 4 and 5, the probes 38 and 40 are at different elevations and the pumping means 24 would therefore not be energized until the level of the liquid contacted the higher probe 40. As previously indicated, the housing 252 is sealed against liquid leakage. Therefore, suitable sealing means 290 is also provided in order to seal the area where related electrical cable means 292 exit the housing 254 for connection to the source of electrical potential 118.

It has been discovered that there is a slight possibility that with prolonged exposure of the probes 38 and 40 to bilge liquid, or the like, containing minerals and foreign particles, that an electro-deposit of elements tends to form on the outer surface of cover 256 as to extend from one of the probes to the other. Under certain circumstances, such a deposit may have sufficient electrical conductivity to complete a circuit as between such probes 38 and 40 and result in the motor pump means 24 becoming energized when, in fact, no energization is required or desired. It has further been discovered that by providing shroud-like extensions 294 and 296, respectively, about the extending portions of probes 40 and 38 that such depositions, if they occur, are not capable of producing the undesired ground-like circuit between the probes 38 and 40. It is not totally understood why such results are obtained; nevertheless through testing it has been found that such results are consistently obtained. Further, it does not appear to be of any difference as to whether such extensions 294 and 296 are integrally formed with cover 256, as illustrated, or suitably secured thereto as by, for example, cementing or the like. Also, it does not appear to be of any material difference as to whether such extensions 294 and 296 are cylindrically tubular as viewed in FIG. 4, or of some other configuration when viewed in the same direction. However, in the preferred form, extensions 294 and 296 have their respective projecting end faces 298 and 300 slightly beyond the projecting ends of probes 40 and 38. In one successfully tested embodiment, such end faces extended in the order of 1/16 inch beyond the respective projecting ends of the probes.

As has been previously stated, it is apparent that the invention, although described with reference to a bilge pumping system, is in fact capable of being practiced in various different environments and may, for example, be employed in situations for detecting a preselected level (or even a series of levels) of a particular liquid and to, in response thereto, creating or causing selected outputs to occur even to the extent that such outputs need not necessarily involve a pumping means.

Although only two preferred embodiments and selected modifications of the invention have been disclosed and described, it is apparent that other embodiments and modifications of the invention are possible within the scope of the appended claims.

I claim:

1. Liquid level sensing apparatus, comprising first gate means having first input terminal means and first output terminal means, second gate means having second input terminal means and second output terminal means, power switch means in circuit with output power circuit means, electrically conductive probe means adapted for contact with liquid being monitored, said first and second gate means being electrically in series relationship with each other so that said first output terminal means and said second input terminal means are in series circuit, said probe means when contacted by said liquid being effective to cause a first signal of a first magnitude to be applied to said first input terminal means and to in turn cause said second output terminal means to produce a first output signal effective for closing said power switch means and completing said output circuit means through said power switch means, delay means, said delay means being effective for preventing said power switch means from immediately opening upon termination of contact as between said liquid and said probe means, said delay means being effective for delaying said opening for a preselected span of time after initial termination of said contact between said liquid and said probe means, said delay means comprising an R-C network having resistor means and capacitor means, and feedback means effective for at times placing additional resistance means in circuit with said capacitor means for increasing the charging rate of said capacitor means.

2. Liquid level sensing apparatus, comprising first gate means having first input terminal means and first output terminal means, second gate means having second input terminal means and second output terminal means, third gate means having third input terminal means and third output terminal means, control transistor means, output power circuit means, power transistor means in said output power circuit means, said first output terminal means being electrically operatively connected to said second input terminal means, said second output terminal means being electrically operatively connected to said third input terminal means, said third output terminal means being electrically operatively connected to said control transistor means, said control transistor means being electrically operatively connected to said power transistor means, first electrical conductor means of a first electrical potential electrically connected to said first input terminal means, second electrical conductor means of a second electrical potential relatively less than said first electrical potential, first electrical probe means electrically connected to said first electrical conductor means, second electrical probe means electrically connected to said second electrical conductor means, said first and second electrical conductor means being effective for operative electrical connection to opposite electrical sides of a related source of electrical potential, said first probe means being effective whenever said liquid engages both said first and second probe means for creating a first signal of a first logic value on said first electrical conductor means and applying said first signal to said first input terminal means, said first gate means upon receiving said first signal being effective to produce a second signal of a second logic value at said first output terminal means for application to said second input terminal means, said second gate means upon receiving said second signal on said second input terminal means being effective to produce a third signal of said first logic value at said second output terminal means for application to said third input terminal means, said third gate means upon receiving said third signal on said third input terminal means being effective to produce a fourth signal of said second logic value at said third output terminal means for application to said control transistor means, said control transistor means being effective upon receiving said fourth signal to switch from a first of its states to a second of its states, and said power transistor means being effective to switch from a first of its states to a second of its states when said control transistor switches from its said first state to its said second state.

3. Liquid level sensing apparatus according to claim 2 and further comprising resistance means in said first electrical conductor means, and wherein said resistance means is electrically between said first probe means and said first input terminal means of said first gate means.

4. Liquid level sensing apparatus according to claim 3 and further comprising capacitor means, said capacitor means having a first electrical side thereof electrically connected to said second electrical conductor means, and said capacitor means having a second electrical side thereof electrically connected to said first electrical conductor means at a point electrically generally between said resistance means and said first input terminal means.

5. Liquid level sensing apparatus according to claim 2 and further comprising resistance means electrically interconnecting said second output terminal means to said third input terminal means.

6. Liquid level sensing apparatus according to claim 5 and further comprising capacitor means, said capacitor means having a first electrical side thereof electrically connected to said second electrical conductor means, and said capacitor means having a second electrical side thereof electrically connected to said resistance means and said third input terminal means as at a point electrically therebetween.

7. Liquid level sensing apparatus according to claim 6 and further comprising diode means electrically in parallel with said resistance means.

8. Liquid level sensing apparatus according to claim 2 and further comprising first resistance means in said first electrical conductor means, said first resistance means being electrically generally between said first probe means and said first input terminal means of said first gate means, first capacitor means, said first capacitor means having a first electrical side thereof electrically connected to said second electrical conductor means, said first capacitor means having a second electrical side thereof electrically connected to said first electrical conductor means at a point electrically generally between said first resistance means and said first input terminal means, second resistance means electrically interconnecting said second output terminal means to said third input terminal means, second capacitor means having a first electrical side thereof electrically connected to said second electrical conductor means, said second capacitor means having a second electrical side thereof electrically connected to said second resistance means and said third input terminal means as at a point electrically therebetween, and diode means electrically in parallel with said second resistance means.

9. Liquid level sensing apparatus according to claim 2 and further comprising fourth gate means having fourth input terminal means and fourth output terminal means, said fourth gate means being electrically in parallel with said third gate means and effective to produce a fifth signal of said second logic value at said fourth output terminal means upon application of said third signal of said first logic value to said fourth input terminal means.

10. Liquid level sensing apparatus according to claim 4 and further comprising fourth gate means having fourth input terminal means and fourth output terminal means, said fourth input terminal means being electrically connected to said third output terminal means of said third gate means, and second resistance means electrically interconnecting said fourth output terminal means to said third input terminal means.

11. Liquid level sensing apparatus according to claim 2 wherein said control transistor means comprises base emitter and collector terminal means, wherein said third output terminal means is electrically connected to said base terminal means, wherein said power transistor means comprises base emitter and collector terminal means, wherein said emitter and collector of said power transistor means are in said output power circuit means, voltage divider means in circuit with said emitter and collector of said control transistor means, and wherein said base terminal means of said power transistor means is electrically connected to said voltage divider means.

12. Liquid level sensing apparatus according to claim 2 wherein there is a direct current between said first and second probe means when both said first and second probe means are contacted by said liquid.

13. Liquid level sensing apparatus according to claim 8 and further comprising electrically non-conductive shielding means generally circumscribing each of said first and second probe means.

14. Liquid level sensing apparatus according to claim 8 and further comprising electrically non-conductive shielding means, said shielding means being situated as to generally circumscribe at least one of said first and second probe means.

15. In structure carrying at least one electrically conductive probe intended for contact with related liquid to be monitored, wherein said probe extends a substantial distance beyond said structure, the improvement of providing a sheath-like shield portion carried by said structure as to generally circumscribe said probe and thereby preclude an electrodeposition on said structure of electrically conductive material of sufficient density and continuity as to form a conductive path to and from said probe where such electrically conductive material is carried by said liquid, said sheath-like shield portion being spaced from said probe for the entire distance in which said probe extends from said structure.

16. Liquid level sensing apparatus according to claim 2 wherein said first and second electrical probe means are situated as to be at respectively different effective elevations relative to the level of said liquid.

17. Liquid level sensing apparatus according to claim 16 and further comprising electrically non-conductive shielding means generally circumscribing each of said first and second probe means.

18. Liquid level sensing apparatus according to claim 2 and further comprising electrically non-conductive shielding means generally circumscribing each of said first and second probe means.

19. Liquid level sensing apparatus, comprising first gate means having first input terminal means and first output terminal means, second gate means having second input terminal means and second output terminal means, control transistor means, output power circuit means, power transistor means in said output power circuit means, said first output terminal means being electrically operatively connected to said second input terminal means, said second output terminal means being electrically operatively connected to said control transistor means, said control transistor means being electrically operatively connected to said power transistor means, first electrical conductor means of a first electrical potential electrically connected to said first input terminal means, second electrical conductor means of a second electrical potential relatively less than said first electrical potential, first electrical probe means electrically connected to said first electrical conductor means, second electrical probe means electrically connected to said second electrical conductor means, said first and second electrical conductor means being effective for operative electrical connection to opposite electrical sides of a related source of electrical potential, said first probe means being effective whenever said liquid engages both said first and second probe means for creating a first signal of a first logic value on said first electrical conductor means and applying said first signal to said first input terminal means, said first gate means upon receiving said first signal being effective to produce a second signal of said first logic value at said first output terminal means for application to said second input terminal means, said second gate means upon receiving said second signal on said second input terminal means being effective to produce a third signal of a second logic value at said second output terminal means for application to said control transistor means, said control transistor means being effective upon receiving said third signal to switch from a first of its states to a second of its states, and said power transistor means being effective to switch from a first of its states to a second of its states when said control transistor switches from its said first state to its said second state.

20. Liquid level sensing apparatus according to claim 19 and further comprising resistance means in said first electrical conductor means, and wherein said resistance means is electrically between said first probe means and said first input terminal means of said first gate means.

21. Liquid level sensing apparatus according to claim 20 and further comprising capacitor means, said capacitor means having a first electrical side thereof electrically connected to said second electrical conductor means, and said capacitor means having a second electrical side thereof electrically connected to said first electrical conductor means at a point electrically generally between said resistance means and said first input terminal means.

22. Liquid level sensing apparatus according to claim 19 and further comprising third gate means having third input terminal means and third output terminal means, said third gate means being electrically in parallel with said second gate means and effective to produce a fourth signal of said second logic value at said third output terminal means upon application of said second signal of said first logic value to said third input terminal means.

23. Liquid level sensing apparatus according to claim 19 wherein said control transistor means comprises base emitter and collector terminal means, wherein said second output terminal means is electrically connected to said base terminal means, wherein said power transistor means comprises base emitter and collector terminal means, wherein said emitter and collector of said power transistor means are in said output power circuit means, voltage divider means in circuit with said emitter and collector of said control transistor means, and wherein said base terminal means of said power transistor means is electrically connected to said voltage divider means.

24. Liquid level sensing apparatus according to claim 19 wherein there is a direct current between said first and second probe means when both said first and second probe means are contacted by said liquid.

25. Liquid level sensing apparatus according to claim 19 wherein said first and second electrical probe means are situated as to be at respectively different effective elevations relative to the level of said liquid.

26. Liquid level sensing apparatus according to claim 19 and further comprising electrically non-conductive shielding means generally circumscribing each of said first and second probe means.

27. Liquid level sensing apparatus according to claim 19 and further comprising electrically non-conductive shielding means, said shielding means being situated as to generally circumscribe at least one of said first and second probe means.

* * * * *

UNITED STATES PATENT AND TRADEMARK OFFICE
CERTIFICATE OF CORRECTION

PATENT NO. : 4,205,237
DATED : May 27, 1980
INVENTOR(S) : GERALD K. MILLER

It is certified that error appears in the above-identified patent and that said Letters Patent are hereby corrected as shown below:

Column 9,
Claim 1, line 17 thereof, between "output" and "circuit" insert --- power ---.

Signed and Sealed this

Fourth Day of November 1980

[SEAL]

Attest:

SIDNEY A. DIAMOND

Attesting Officer

Commissioner of Patents and Trademarks